(12) United States Patent
Achleitner et al.

(10) Patent No.: US 6,659,553 B2
(45) Date of Patent: Dec. 9, 2003

(54) SEATS FOR VEHICLES, AIRPLANES OR THE LIKE

(75) Inventors: August Achleitner, Oesterreichischer Staatsbierger (DE); Robert Mc Cann, Newport Coast, CA (US)

(73) Assignee: Dr. Ing. h.c.F. Porsche Aktiengesellschaft, Weissach (DE)

( * ) Notice: Subject to any disclaimer, the term of this patent is extended or adjusted under 35 U.S.C. 154(b) by 0 days.

(21) Appl. No.: 09/949,850

(22) Filed: Sep. 12, 2001

(65) Prior Publication Data

US 2002/0089220 A1 Jul. 11, 2002

(30) Foreign Application Priority Data

Sep. 12, 2000 (DE) ......................... 100 44 963

(51) Int. Cl.⁷ ............................................. A47C 3/025
(52) U.S. Cl. ............... 297/284.9; 297/284; 297/452.24; 297/250.1
(58) Field of Search .................. 297/284.9, 452.24, 297/452.34, 112, 114, 406, 398, 423.17, 423.29, 250.1

(56) References Cited

U.S. PATENT DOCUMENTS

| | | | | |
|---|---|---|---|---|
| 3,773,382 A | * | 11/1973 | Coursault et al. | 297/284.9 |
| 4,370,000 A | * | 1/1983 | Kazaoka et al. | 297/284.9 |
| 4,615,561 A | | 10/1986 | Nomura | |
| 4,679,854 A | * | 7/1987 | Putsch et al. | 297/216.13 |
| 4,913,491 A | * | 4/1990 | Mizuno et al. | 297/284.9 |
| 4,924,162 A | * | 5/1990 | Sakamoto et al. | 297/284.9 |
| 4,938,529 A | * | 7/1990 | Fourrey | 297/284.9 |
| 5,022,709 A | * | 6/1991 | Marchino | 297/284.1 |
| 5,370,446 A | | 12/1994 | Bancod | |
| 5,645,317 A | * | 7/1997 | Onishi et al. | 297/250.1 |
| 6,045,183 A | * | 4/2000 | Weber | 297/173 |
| 6,139,106 A | * | 10/2000 | Aldridge | 297/391 |

FOREIGN PATENT DOCUMENTS

| | | |
|---|---|---|
| DE | 2134325 | 3/1972 |
| DE | 3417616 | 12/1984 |
| DE | 8507191 | 5/1985 |
| DE | 9014111 | 10/1990 |
| DE | 19750223 | 3/2000 |
| FR | 2768092 | 3/1999 |
| JP | 58-224818 | 12/1983 |
| WO | 9209451 | 6/1992 |

* cited by examiner

*Primary Examiner*—Peter M. Cuomo
*Assistant Examiner*—Erika Garrett
(74) *Attorney, Agent, or Firm*—Crowell & Moring LLP

(57) ABSTRACT

A seat for automotive vehicles, airplanes or the like has a seat part and a backrest part. Seat part supports are arranged on both sides of a longitudinal center plane of the seat on longitudinal sides of the seat part. Backrest part supports are arranged on the longitudinal sides of the backrest part. The seat part supports and the backrest part supports provide the passenger using the seat with a lateral support. For optimizing the seat with respect to comfort and support for the passenger using it, the seat part supports as well as the backrest part supports are constructed in an adjustable manner.

18 Claims, 3 Drawing Sheets

SEATS FOR VEHICLES, AIRPLANES OR THE LIKE

BACKGROUND AND SUMMARY OF THE INVENTION

The invention relates to a seat for vehicles including automobiles, airplanes and the like. Preferred embodiments of the invention relate to such a seat, comprising a seat part and a backrest part, seat part supports being arranged on both sides of a longitudinal center plane of the seat on longitudinal sides of the seat part, and backrest part supports being arranged on longitudinal sides of the backrest part, which seat part supports and backrest part supports provide a passenger using the seat with a lateral support.

Seats installed in vehicles or airplanes which are frequently exposed to changing curves or high cornering speeds are expected to offer a good support to the passengers who are transported on them.

German Patent Document DE 34 17 616 C2 (corresponding U.S. Pat. No. 4,615,561) shows a vehicle seat which has a seat part and a backrest part which are provided with stationary seat part supports and backrest part supports respectively. The seat part supports and the backrest part supports project beyond the seat part cover surfaces and the backrest part cover surfaces, which makes it more difficult for the passengers to sit down essentially transversely to the vehicle seat.

It is therefore an object of the invention to take such measures with respect to a seat for automobile vehicles, airplanes or the like that the respective passenger using the seat is perfectly supported during lateral accelerations and the above-mentioned passenger can comfortably sit down in this seat.

According to certain preferred embodiments of the invention, this object is achieved by providing a seat for vehicles including automobiles and airplanes comprising a seat part and a backrest part, seat part supports being arranged on both sides of a longitudinal center plane of the seat on longitudinal sides of the seat part, and backrest part supports being arranged on longitudinal sides of the backrest part, which seat part supports and backrest part supports provide a passenger using the seat with a lateral support, wherein the seat part supports and the backrest part supports of the seat are constructed to be adjustable.

Principal advantages achieved by means of the invention are that, because of the adjustable seat part supports and backrest part supports of the seat part and the backrest part, a seat equipped therewith offers to the respective passenger not only a good support, but these supports can be moved into a position in which it is easy for this passenger to sit down in the seat. The seat part supports and backrest part supports may be designed such that they can be adapted to the passengers' different sizes. The adjustability of the backrest part supports can easily be implemented if the latter are swivellable by way of swivelling axes extending in the longitudinal direction of the backrest part and furthermore are disposed on hinges arranged at a distance in the longitudinal direction of these swivelling axes. The contractions in the backrest part and the recesses in the backrest supports contribute to the fact that a targeted mobility of the backrest part supports is ensured about the swivelling axes. It is also advantageous to align the swivelling axes of the seat part supports horizontally and to arrange them at a relatively small distance from a forward transversely extending boundary of the seat part. Finally, the arrangement of the adjusting lever for the longitudinal adjustment of the seat in the seat part contributes to a simplification of the construction and the ergonomic operation of the seat.

The following description and the claims set forth further advantageous features of the invention.

Other objects, advantages and novel features of the present invention will become apparent from the following detailed description of the invention when considered in conjunction with the accompanying drawings.

DETAILED DESCRIPTION OF THE DRAWINGS

Figure 1:
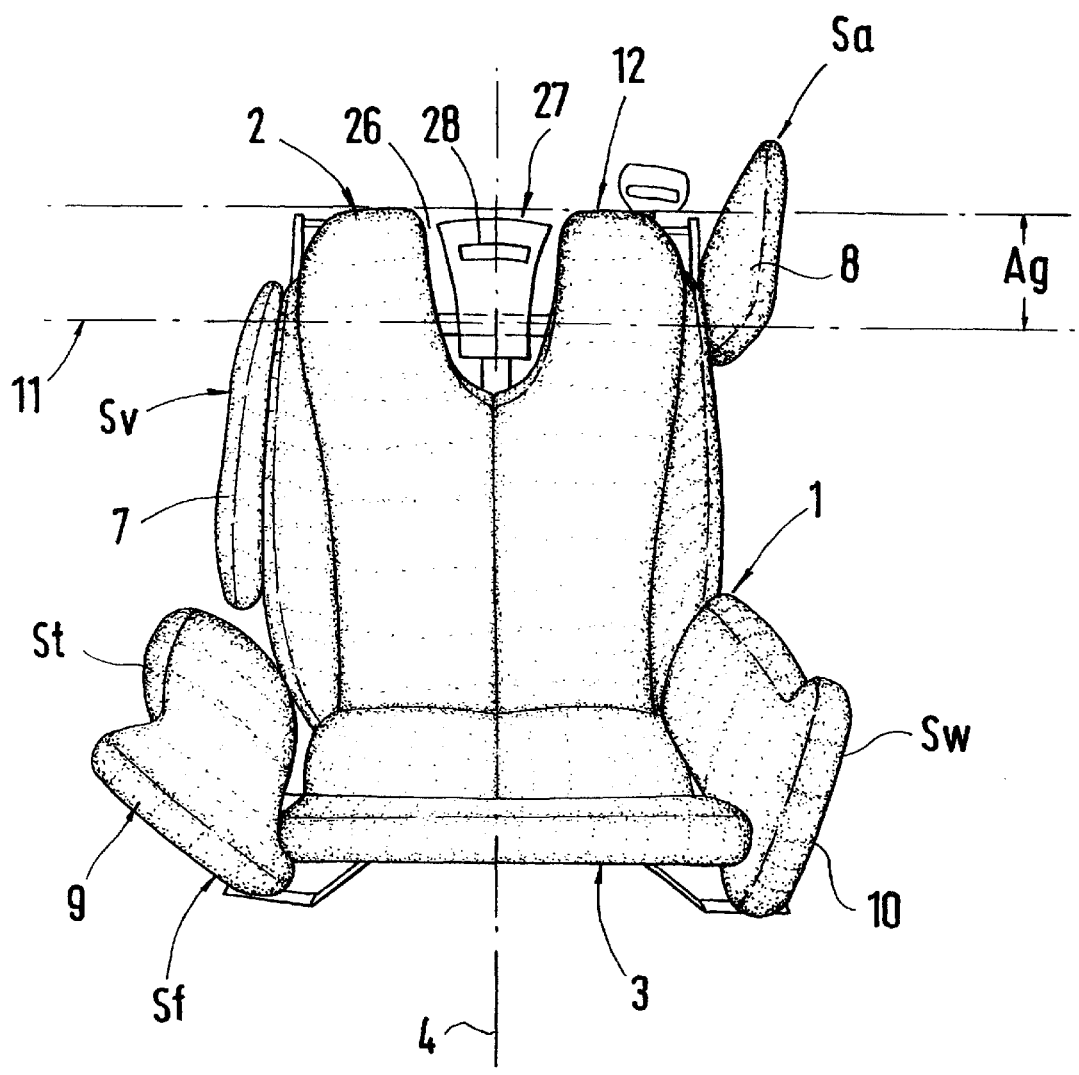
FIG. 1 is a diagonal view from above in the driving direction of a seat constructed according to a preferred embodiment of the invention.
Figure 2:
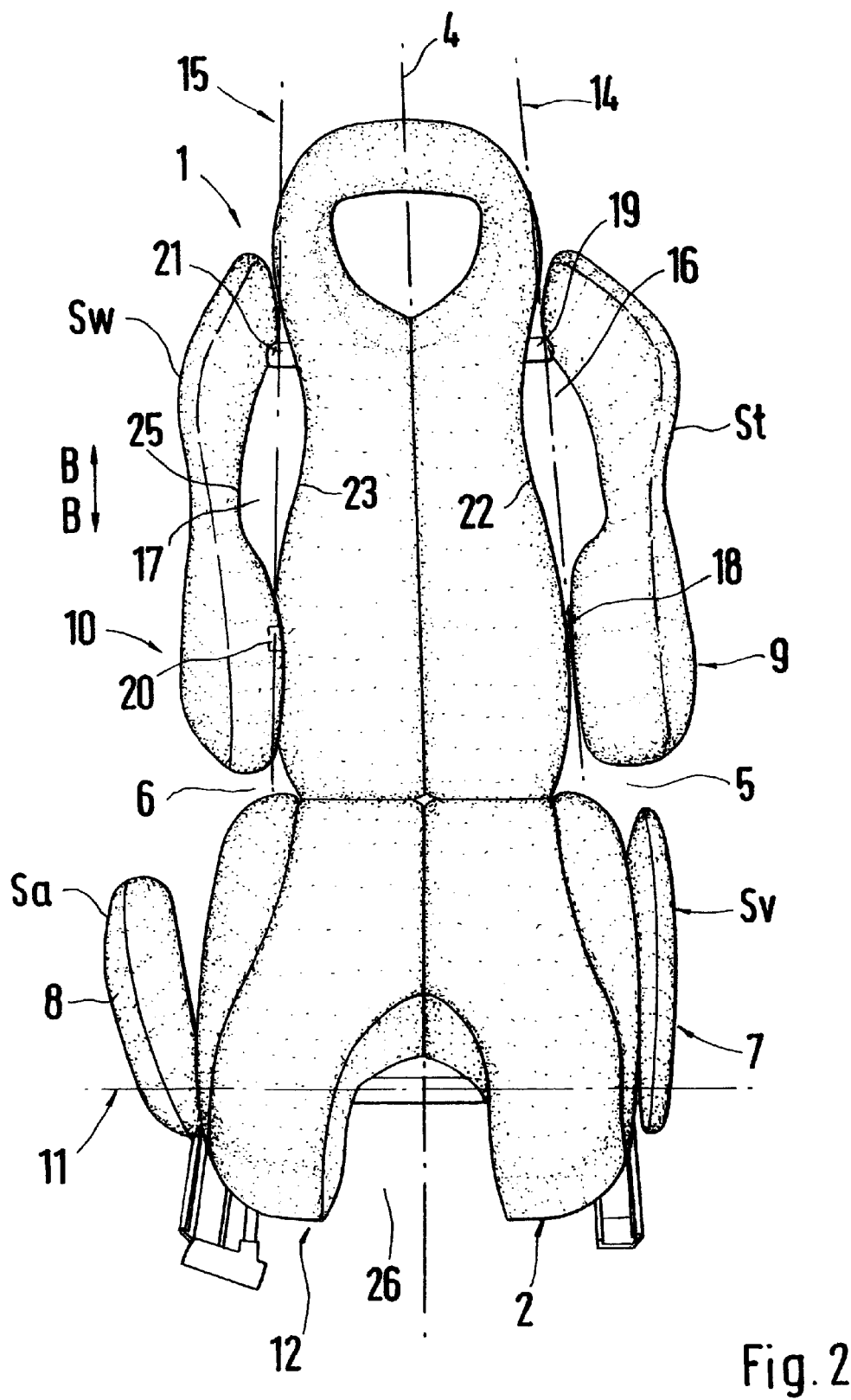
FIG. 2 is a diagonal view from above and against the driving direction of the above-mentioned seat.
Figure 3:
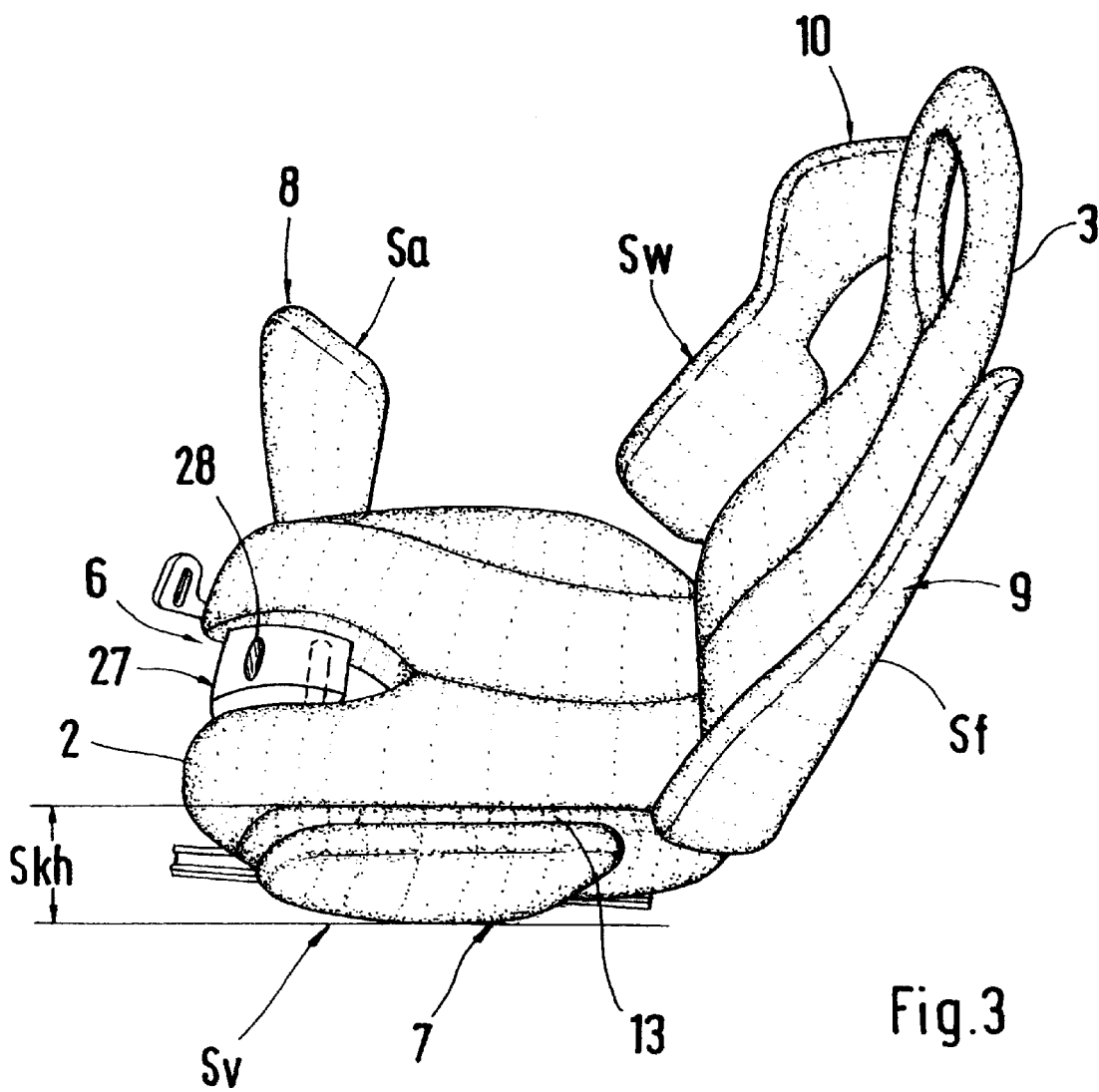
FIG. 3 is a diagonal view from above and transversely to the driving direction of the seat according to FIG. 1.

A seat 1, which is suitable for the installation into vehicles, airplanes or the like, is longitudinally displaceably disposed on a corresponding floor of a vehicle body—not shown. The seat 1 is formed by a seat part 2 and a backrest part 3 which are arranged at an angle with respect to one another. Seat part supports 7, 8 and backrest part supports 9, 10 respectively are provided on both sides of a longitudinal center plane 4 at the longitudinal sides 5, 6 of the seat 1 or of the seat part 2 and of the backrest part 3. The seat part supports 7, 8 and the backrest part supports 9, 10 provide a passenger using the seat with a lateral support, for example, when cornering in different directions and with correspondingly high lateral acceleration values. The seat part supports 7, 8 and the backrest part supports 9, 10 are constructed to be adjustable, specifically independently of one another. For this purpose, the seat part supports 7, 8 are constructed to be adjustable by way of a swivelling axis 11, which extends transversely with respect to the seat 1, such that the seat part supports 7, 8 can be moved out of a first sunk position Sv into a second extended position Sa and vice versa. The swivelling axis 11 is arranged at a relatively short distance from a forward boundary 12 of the seat or of the seat part 2 and is approximately horizontally aligned. The seat part supports 7, 8, which have a plate-type construction, are situated in the sunk position Sv within the seat cushion height Skh of the seat part 2; that is, adjusted in this manner, they do not project beyond the seat cushion cover surface 13 of the above-mentioned seat part.

The backrest part supports 9, 10 can be adjusted by means of swivelling axes 14, 15 which extend in the longitudinal direction B—B of the backrest part 3, specifically along its longitudinal sides 16, 17. For this purpose, the backrest supports 9, 10 are disposed on hinges 18, 19 and 20, 21 which are arranged at a distance from one another along the swivelling axes 14, 15. The backrest part supports 9, 10 can be adjusted between a first flat position Sf and a second angular position Sw.

On the longitudinal sides 16, 17 between the hinges 18, 19 and 20, 21, the backrest part 3 has contractions 22, 23 which lead away from the swivelling axes 14, 15. The backrest part supports 9, 10 are provided with recesses 24, 25 between the hinges 18, 19 and 20, 21, which recesses 24, 25 have convex courses with respect to the longitudinal sides 16, 17 of the backrest part 3.

The seat part supports 7, 8 and the backrest part supports 9, 10 can be manually adjusted by means of suitable devices.

However, it is also possible to adjust them electrically, hydraulically or pneumatically.

In the longitudinal center plane 4 between the seat part supports 7, 8, the seat part 2 is provided with a recess 26 which is open in the direction of the forward boundary 12. This recess 26 is used for accommodating an adjusting lever 27 by means of which, for example, the longitudinal adjustment of the seat can be implemented in the vehicle occupant compartment. Together with a grip 28, the adjusting lever 27 is accommodated in the recess 26 in a fully sunk manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Seat for vehicles, including automobiles and airplanes, comprising a seat part and a backrest part, seat part supports being arranged on both sides of a longitudinal center plane of the seat on longitudinal sides of the seat part, and backrest part supports being arranged on longitudinal sides of the backrest part, which said seat part supports and backrest part supports provide a passenger using the seat with lateral support,
   wherein the seat part supports and the backrest part supports of the seat are constructed to be adjustable, and
   wherein the seat part supports can be adjusted by way of a swivelling axis which extends transversely to the seat and is approximately horizontally aligned.

2. Seat according to claim 1,
   wherein the swivelling axis is arranged at a relatively short distance from a forward transversely extending boundary of the seat part, and
   wherein the seat part supports can be adjusted from a first sunk position into a second extended position and vice versa.

3. Seat according to claim 2,
   wherein the seat part supports are situated in the sunk position within a seat cushion height of the seat part.

4. Seat according to claim 1, wherein the backrest part supports can be adjusted by way of swivelling axes extending in the longitudinal direction of the backrest part.

5. Seat according to claim 4, wherein the backrest part supports are disposed on hinges spaced in the longitudinal directon of the swivelling axes.

6. Seat for vehicles, including automobiles and airplanes, comprising a seat part and a backrest part, seat part supports being arranged on both sides of a longitudinal center plane of the seat on longitudinal sides of the seat part, and backrest part supports being arranged on longitudinal sides of the backrest part, which said seat part supports and backrest part supports provide a passenger using the seat with lateral support,
   wherein the seat part supports and the backrest part supports of the seat are constructed to be adjustable,
   wherein the backrest part supports can be adjusted by way of swivelling axes extending in the longitudinal direction of the backrest part,
   wherein the backrest part supports are disposed on hinges spaced in the longitudinal direction of the swivelling axes, and
   wherein the backrest part has contractions extending between the hinges, on longitudinal sides of the seat.

7. Seat for vehicles, including automobiles and airplanes, comprising a seat part and a backrest part, seat part supports being arranged on both sides of a longitudinal center plane of the seat on longitudinal sides of the seat part, and backrest part supports being arranged on longitudinal sides of the backrest part, which said seat part supports and backrest part supports provide a passenger using the seat with lateral support,
   wherein the seat part supports and the backrest part supports of the seat are constructed to be adjustable,
   wherein the backrest part supports can be adjusted by way of swivelling axes extending in the longitudinal direction of the backrest part,
   wherein the backrest part supports are disposed on hinges spaced in the longitudinal direction of the swivelling axes, and
   wherein the backrest part supports have recesses between the hinges and extending away from the backrest part.

8. Seat for vehicles, including automobiles and airplanes, comprising a seat part and a backrest part, seat part supports being arranged on both sides of a longitudinal center plane of the seat on longitudinal sides of the seat part, and backrest part supports being arranged on longitudinal sides of the backrest part, which said seat part supports and backrest part supports provide a passenger using the seat with lateral support,
   wherein the seat part supports and the backrest part supports of the seat are constructed to be adjustable,
   further comprising an adjusting lever used for longitudinal adjusting of the seat,
   wherein a recess for accommodating the adjusting lever is provided in the seat part between the seat part supports, which said recess is open in a direction of a forward boundary of the seat part.

9. Seat according to claim 8,
   wherein the adjusting lever is inserted into the recess in a sunk manner.

10. A vehicle passenger seat, comprising:
    a seat part,
    a backrest part,
    a seat part support arranged at a lateral side of the seat part for laterally supporting a passenger on the seat during certain driving conditions,
    means accommodating selective movement of the seat part support between a support position laterally supporting a passenger on the seat and an exit accommodating position permitting lateral movement of the passenger with respect to the seat part,
    a backrest part support arranged at a lateral side of the backrest part for laterally supporting a passenger on the seat during certain driving conditions, and
    means accommodating movement of the backrest part support between a support position laterally supporting a passenger on the seat and an exit accommodating position permitting lateral movement of the passenger respect to the backrest part,
    wherein respective similar ones of said seat part supports and backrest part supports are provided at respective opposite lateral sides of the seat along with corresponding respective ones of said means accommodating selective movement of said supports, and
    wherein the seat part supports can be adjusted by way of a swivelling axis which extends transversely to the seat and is approximately horizontally aligned.

11. Seat according to claim 10,
wherein the swivelling axis is arranged at a relatively short distance from a forward transversely extending boundary of the seat part, and
wherein the seat part supports can be adjusted from a first sunk position into a second extended position and vice versa.

12. Seat according to claim 11,
wherein the seat part supports are situated in the sunk position within a seat cushion height of the seat part.

13. A vehicle passenger seat according to claim 10, wherein the backrest part supports can be adjusted by way of swivelling axes extending in the longitudinal direction of the backrest part.

14. Seat according to claim 10,
wherein the backrest part supports are disposed on hinges spaced in the longitudinal direction of the swivelling axes.

15. Seat according to claim 14,
wherein the backrest part has contractions between the hinges extending on the longitudinal sides of the seat.

16. A vehicle passenger seat according to claim 10, wherein said means accommodating selective movement of the seat part support includes one of electrical, hydraulic and pneumatic drive devices.

17. A vehicle passenger seat according to claim 10, wherein said means accommodating selective movement of the backrest part support includes one of electrical, hydraulic and pneumatic drive devices.

18. A vehicle passenger seat according to claim 16, wherein said means accommodating selective movement of the backrest part support includes one of electrical, hydraulic and pneumatic drive devices.

* * * * *